(12) United States Patent
Takasugi

(10) Patent No.: US 6,786,407 B1
(45) Date of Patent: Sep. 7, 2004

(54) READER AND SYSTEM FOR NONCONTACT TYPE INFORMATION STORAGE MEDIUM

(75) Inventor: Wasao Takasugi, Higashiyamato (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/453,225

(22) Filed: Dec. 3, 1999

(30) Foreign Application Priority Data

Dec. 4, 1998 (JP) .......................................... 10-346065

(51) Int. Cl.[7] .................................................. G06K 7/08
(52) U.S. Cl. ...................................... 235/451; 235/439
(58) Field of Search ................................. 235/492, 487, 235/451, 449, 435, 493; 340/10.1–10.6

(56) References Cited

U.S. PATENT DOCUMENTS 4,626,669 A * 12/1986 Davis et al. ................. 235/380
5,664,228 A * 9/1997 Mital ........................... 710/62
5,834,747 A * 11/1998 Cooper ....................... 235/449
5,841,122 A * 11/1998 Kirchhoff .................... 235/492
6,079,621 A * 6/2000 Vardanyan et al. ......... 235/487
6,216,954 B1 * 4/2001 Kuwamoto et al. ......... 235/486

* cited by examiner

Primary Examiner—Michael G. Lee
Assistant Examiner—Jamara A. Franklin
(74) Attorney, Agent, or Firm—Birch, Stewart, Kolasch & Birch, LLP

(57) ABSTRACT

A reader and system for a noncontact type information storage medium, capable of providing an easy-to-use user interface for information exchange between the non-contact formation type information storage medium and the reader. A reader for a noncontact type information storage medium for reading data from the medium via an antenna through magnetic induction or magnetic coupling, the reader having a display device for displaying whether a reception of data transmitted from the medium via the antenna is succeeded or failed or for displaying a communication result with the medium.

8 Claims, 3 Drawing Sheets

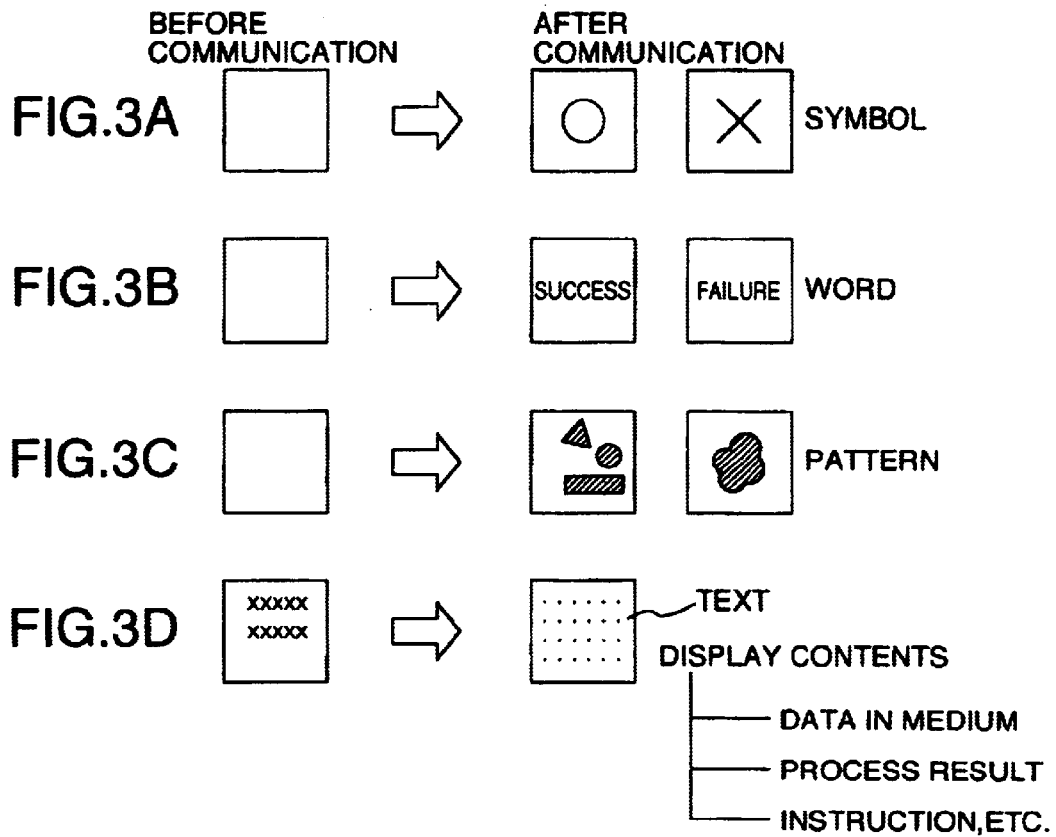
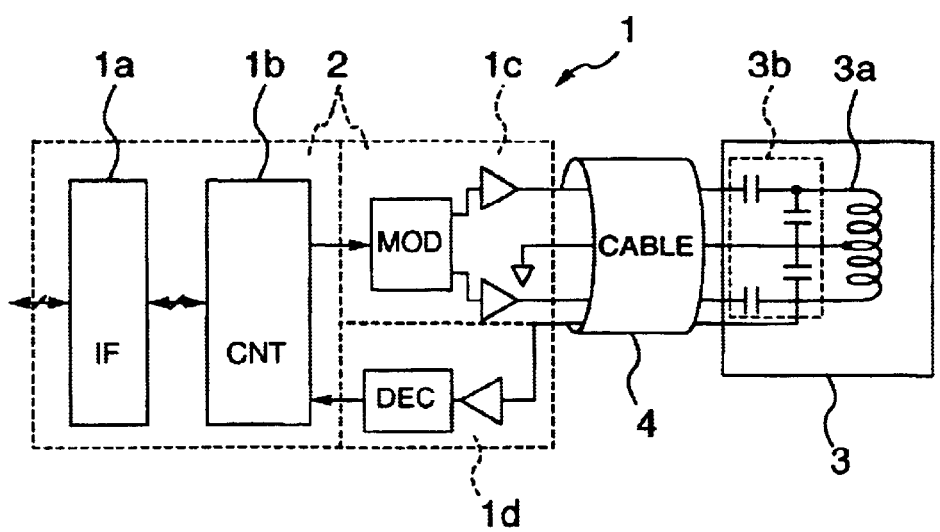
FIG.4
PRIOR ART

READER AND SYSTEM FOR NONCONTACT TYPE INFORMATION STORAGE MEDIUM

BACKGROUND OF THE INVENTION

The present invention relates to a reader and system for a noncontact type information storage medium, and more particularly to an improvement on a reader unit of a noncontact card reader capable of providing an easy-to-use user interface for information exchange between a card and the card reader. Such information exchange is performed in an automatic ticket examination system, a room entrance management system or the like through magnetic induction between the card reader and a noncontact IC card such as a noncontact commutation ticket and a noncontact management card.

For information exchange at a check gate of an automatic ticket examination system, a room entrance management system or the like, a radio communication system has been proposed recently in which information exchange is performed between a reader/writer (R/W) and a commutation ticket card, a management card or the like in a noncontact manner. Some of such radio communication systems are now in an experiment stage or under practical use. The systems of this kind are convenient because it is not necessary to make a card contact the surface of an antenna of a reader/writer or enter a slot. Particularly in the automatic ticket examination system, it is possible to shorten a time taken by a commutator to pass through the gate, which relieves congestion and shortens a wait time.

As these commutation tickets and management cards, noncontact IC cards are uses. Although a battery has been conventionally built in a card, a card of another kind has been recently studied or proposed which is supplied with a power via radio waves to transmit/receive data. Noncontact IC cards of the kind whose power is supplied by radio waves include a nearest proximity type (about 0 to 2 mm to the noncontact IC card), a nearer proximity type (about 2 mm to 10 cm) and a near proximity type (about 70 cm or further).

With a card of the nearest proximity type or nearer proximity type, data transmission/reception is performed relative to a reader/writer at a nearest or nearer distance of several millimeters to centimeters. With a card of the near proximity type, data transmission/reception is performed relative to a reader/writer at a near distance of 70 cm or about 1 meter to several meters, to thereby supply/receive data. The frequency of 4.91 MHz or 13.56 MHz for the nearest proximity type and the frequency of 13.56 MHz for the nearer proximity type are now under examination.

FIG. 4 is a block diagram showing a conventional reader/writer of this kind.

Reference numeral 1 represents a reader/writer. A loop antenna 23 is connected via a cable 4 to a main block 2 of the reader/writer. The loop antennal 3 is mounted on the upper plane of an automatic ticket examination gate.

As shown in FIG. 4, the main block 2 of the reader/writer 1 is connected via an interface (IF) 1a to a host computer (not shown) and includes a controller (CNT) 1b, a transmitter circuit 1c and a receiver circuit 1d. The reader/writer 1 includes this main block 2 and loop antenna 3, the latter having a matching circuit 3b and an antenna coil 3a. The antenna 3 is connected via the cable 4 to the transmitter circuit 1c and receiver circuit 1d.

In the transmission circuit 1c, MOD represents a modulator, and in the receiver circuit 1d, DEC represents a decoder.

As shown in FIG. 5, as a noncontact IC card 7 is approached to the upper region of the antenna 3 of the reader/writer 1 mounted at an upper position of a gate 6 and when it enters a read area 5 formed over the antenna 3, the reader/writer 1 reads data from the noncontact IC card 7. The reader/writer writes data, when necessary, into the noncontact IC card 7.

In data communication of the nearer or near proximity type, if the reader/writer 1 transfers data to and from the noncontact IC card at the distance of about 10 cm, the angle between the IC card and the antenna 3 of the reader/writer 1 poses some issue. Namely, the angle generally tends to shorten the operable distance to the antenna 3.

The noncontact IC card 7 operates upon reception of a power from radio waves transmitted from the reader/writer 1 side. If the main flat plane of the noncontact IC card 7 is in parallel to the propagation direction of radio waves transmitted from the antenna 7, power is hardly supplied. In this case, even if a power is supplied, it is very small so that the intensity of radio waves transmitted from the noncontact IC card 7 to the reader/writer 1 is also very small and the reader/writer 1 cannot receive sufficient radio waves. Even if in the distance range of 10 cm or nearer, a reliably operable distance is actually more shorter than expected because of various use conditions, and cannot be recognized easily by the user. In addition, the user is not supplied with information which ensures that necessary communication was executed correctly. Therefore, it is difficult for the user to confirm whether the necessary communication was executed correctly.

Although an output of the antenna may be raised to expand the communication area, there are restrictions defined by regulations of Radio Law, safety standards for human bodies, and the like. In order to retain secure communication contents, repetitive communications may be required. If such repetitive communications are required, expected effects of such noncontact communication as in automatic ticket examination or the like cannot be realized sufficiently.

SUMMARY OF THE INVENTION

It is an object of the present invention to solve the above-described problems associated with conventional techniques and provide a reader and system for a noncontact type information storage medium, capable of providing an easy-to-use user interface for information exchange between the noncontact type information storage medium and the reader.

In order to achieve the above object of the invention, the reader and system for a noncontact type information storage medium for reading data from the medium via an antenna through magnetic induction or magnetic coupling, has a display device for displaying whether a reception of data transmitted from the medium via the antenna is succeeded or failed or for displaying a communication result with the medium.

By providing the display device for displaying whether a reception of data transmitted from the medium via the antenna is succeeded or failed or for displaying a communication result with the medium, a user can adjust the distance between a reader and a noncontact type information storage medium, while looking at the display means, and can maintain the medium at a proper position relative to the reader or antenna. In addition, a success or failure of communication can be confirmed.

If a liquid crystal display device is used as the display device and the communication result with the medium is displayed by using one of a word, a symbol, a pattern and a text, not only the communication success or failure but also the details of the communication result can be confirmed by a user.

Accordingly, an easy-to-use user interface for noncontact information exchange between a noncontact type information storage medium and a reader can be realized.

BRIEF DESCRIPTION OF THE DRAWINGS

FIGS. 3A, 3B, 3C, and 3D show examples of display contents on the display device.

FIG. 4 is a schematic block diagram showing the structure of a conventional noncontact type reader/writer.

DETAILED DESCRIPTION OF THE EMBODIMENTS

Figure 1:
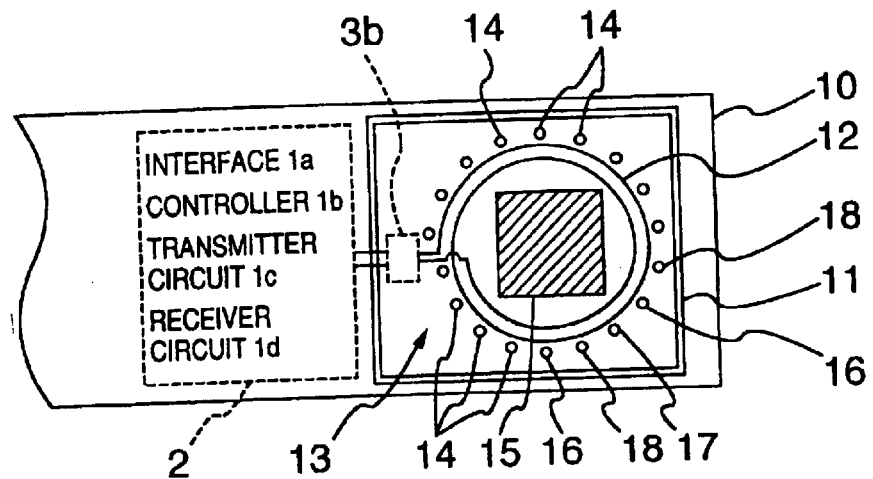
FIG. 1 is a plan view of a reader for a noncontact type information storage medium applied to a noncontact card reader, according to an embodiment of the invention.
Figure 2:
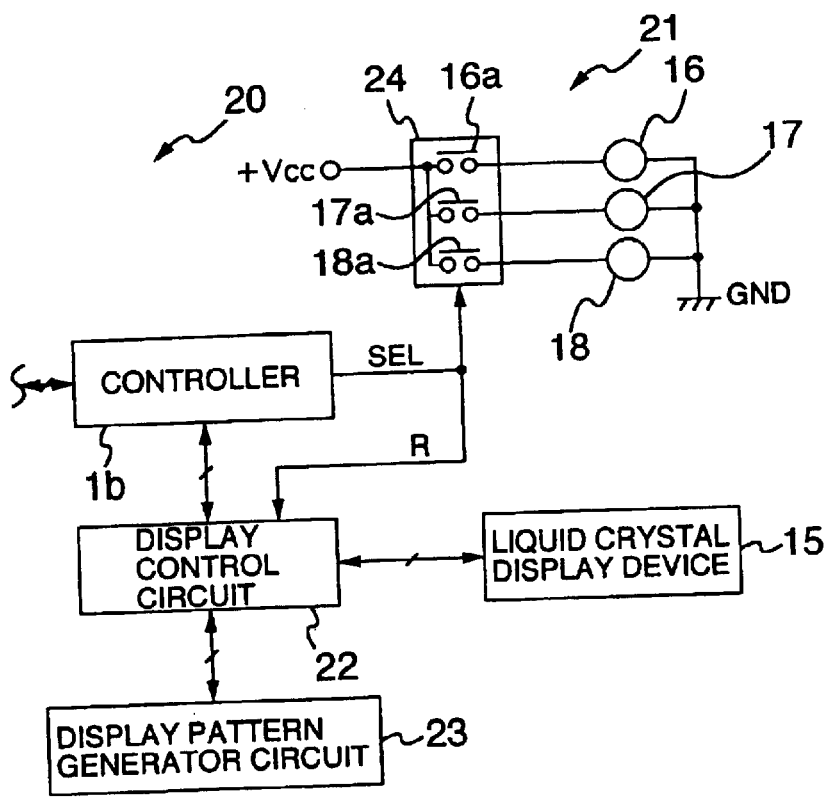
FIG. 2 is a circuit diagram of a driver control circuit for driving light emitting elements and a display device shown in FIG. 1.
Figure 5:
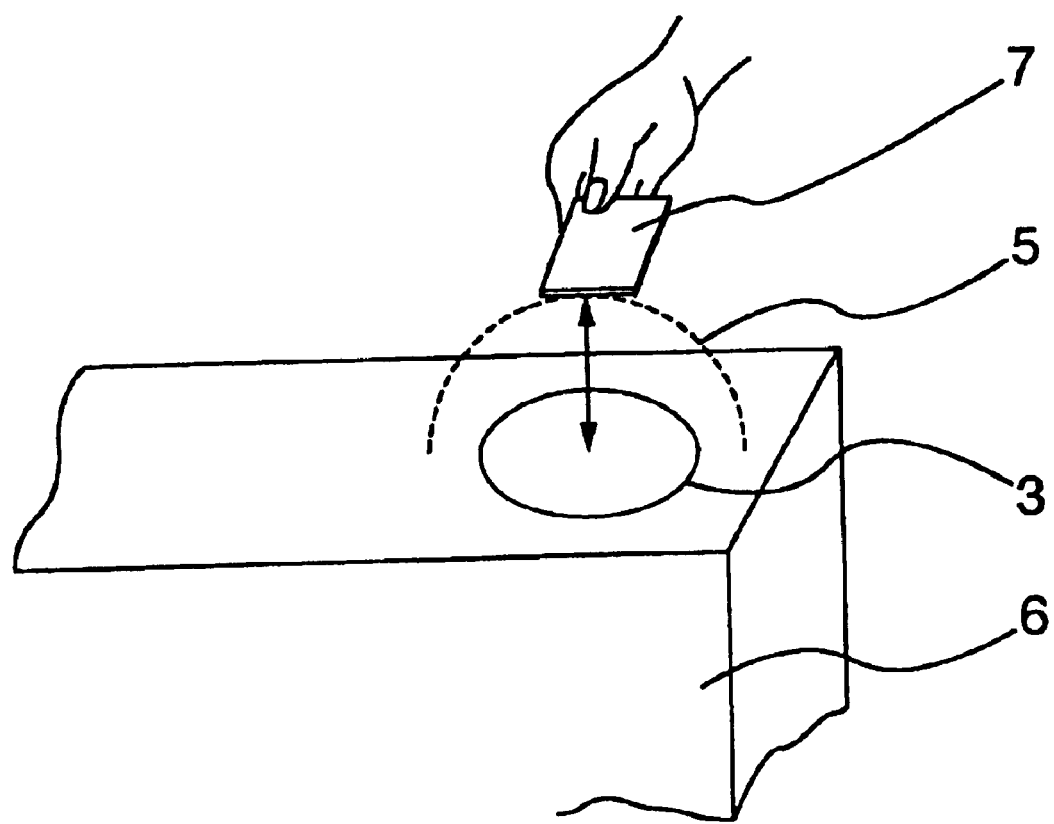
FIG. 5 is a diagram illustrating how a reader/writer reads data from a noncontact IC card.

FIG. 1 is a plan view of a reader for a noncontact type information storage medium applied to a noncontact card reader, according to an embodiment of the invention, FIG. 2 is a circuit diagram of a driver control circuit for driving light emitting elements and a display device shown in FIG. 1, and FIGS. 3A, 3B, 3C, and 3D show examples of display contents on the display device.

Referring to FIG. 1, reference numeral 10 represents a gate of an automatic ticket examination system (room entrance management system or the like), and reference numeral 11 represents a rectangular read area indication frame of the gate 10. Under this read area indication frame 11, an antenna block 13 built in with an antenna coil 12 is provided. The read area indication frame 11 is slightly projected above the upper plane of the antenna block 13.

The antenna block 13 has a light emitting element group 14 of a number of LEDs disposed circularly around the antenna coil 12. A liquid crystal display device 15 is provided inside of the loop of the antenna coil 12.

A block indicated by a broken line is a reader/writer block 2 which includes an interface 1a, a controller 1b, a transmitter circuit 1c, a receiver circuit 1d and the like similar to those shown in FIG. 4. This reader/writer block 2 is mounted in the housing of the gate 10, adjacent to the antenna 13.

The light emitting element group 14 of LEDs is constituted of LEDs of three colors sequentially and circularly disposed in the order of white, blue and green colors. A white color LED is indicated at reference numeral 16, a blue color LED is indicated at reference numeral 17, and a red color LED is indicated at reference numeral 18.

In this embodiment, the state that white LEDs are being illuminated indicates a reception allowable state, the state that blue LEDs are illuminated after the white LEDs are turned off indicates a normal communication completion, and the state that red LEDs are illuminated after the white LEDs are turned off indicates an abnormal or defective communication state. A user can immediately know the result of communication with the reader/writer.

FIG. 2 shows the driver control circuit including an LED drive circuit 21, a display control circuit 22, and a display pattern generator circuit 20. The LED drive circuit 21 has a switch circuit 24 which receives a selection signal SEL from the controller (CNT) 1b and selectively turns on or off the switch circuit 24 to thereby control the above-described states of the LEDs in accordance with a process result of a signal from the noncontact card 7.

It is assumed that the switch circuit 24 has three switches connected in parallel in correspondence with three colors of the LEDs. Reference numeral 16 represents one of the white LEDs, reference numeral 17 represents one of the blue LEDs, and reference numeral 18 represents one of the red LEDs.

One terminals of these three switches 16a, 17a, and 18a of the switch circuit 21 are connected to a power source line +Vcc. Ones of LEDs 16, 17, and 18 are supplied with a power from the power source when the switch of a corresponding color is turned on in response to the selection signal SEL.

The controller 1b generates the selection signal SEL to select the LEDs to be illuminated, in accordance with data or signals from the receiver circuit 1d. For example, the selection signal SEL for selecting the white LEDs 16 is generated if a power can be supplied by radio waves in the read area 5 and the reader/writer stands by for receiving data from the noncontact IC card 7.

The noncontact IC card 7 enters a communication enabled state when a power is supplied from radio waves transmitted from the reader/writer 1. In the communication enabled state, some of noncontact IC cards automatically return a response and others of the noncontact IC cards return a response after an access request signal (REQ) is received from the reader/writer 1. In the automatic ticket examination system or the like, the latter scheme is adopted. After the noncontact IC card 7 enters the communication enabled state, it stands by until a command of the access request signal (REQ) is received, and when the command of the access request signal (REQ) is received, it returns a response. The controller 1b monitors whether or not the response is returned in a predetermined time period. In accordance with the process result of a signal received from the noncontact IC card 7, the controller 1b controls to selectively turn on ones of the LEDs 17 and 18.

The colors, white, blue and red, are not limited only thereto, but other colors may also be used. Instead of different colors, one color may be used. For example, turned-off LEDs are turned on if a reception success for the noncontact IC card 7 is established, whereas turned-on LEDs are turned off if a reception failure for the noncontact IC card 7 occurs.

The illumination means is not limited only to LEDs, but various illumination means may be used such as candescent lamps and fluorescent lamps. Alternatively, different sounds for the reception success and failure may be generated together with turn-on and turn-off of the illumination means.

In response to a signal R representative of the reception result or the selection signal SEL supplied from the controller 1b, the display control circuit 20 accesses the display pattern generator circuit 23 and reads a pattern corresponding to the reception success or failure which pattern is in turn supplied to the liquid display device 15 to display it.

FIGS. 3A to 3D show examples of the display contents on the liquid display device 15.

FIG. 3A shows an example of the display contents in which a circle symbol indicates a reception success, a cross symbol indicates a reception failure, and no symbol is displayed before communication.

FIG. 3B shows an example of the display contents in which words "SUCCESS" and "FAILURE" are selectively displayed, the former indicates a reception success, the latter indicates a reception failure, and no word is displayed before communication.

FIG. 3C shows an example of the display contents in which patterns are selectively displayed, a fine sky pattern indicates a reception success, a cloudy sky pattern indicates a reception failure, and no pattern is displayed before communication.

FIG. 3D shows an example of the display contents in which texts are selectively displayed. The contents of a text includes data in the medium, a process result, an instruction or the like.

In the above embodiment, the light emitting elements and display device are used as examples of the display means. One of them may be used instead of using both.

Although the antenna block is mounted under the gate, it may be mounted on the side wall of the gate. The display means may be mounted near the antenna block at the position different from the inside of the loop of the antenna coil.

The antenna block may have a transceiver circuit in place of the transmitter circuit and receiver circuit. The controller or the like may be built in the antenna block to constitute a reader, or in a reader/writer as a whole. The antenna is not limited only to a loop antenna.

Also in this embodiment, although the antenna block is mounted on the gate of the automatic ticket examination system, a room entrance management system or the like, the invention is not limited only thereto, but obviously such an antenna block may be mounted on an input unit of other systems for the confirmation, authentication or the like of various types of noncontact storage media.

The reader/writer for a noncontact IC reader may be only a reader without a writer.

As described so far, according to an embodiment of the invention, display means is provided for displaying whether a reception of data from a noncontact type information storage medium via an antenna is succeeded or failed or for displaying a communication result with the noncontact type information storage medium. Accordingly, a user can adjust the distance between a reader and a noncontact type information storage medium, while looking at the display means, and can maintain the medium at a proper position relative to the reader or antenna. In addition, a success or failure of communication can be confirmed.

Accordingly, an easy-to-use user interface for noncontact information exchange between a noncontact type information storage medium and a reader can be realized.

What is claimed is:

1. A reader for a noncontact information storage medium for reading data from the medium via an antenna through magnetic induction or magnetic coupling, the reader comprising:

an antenna coil having an inner periphery region and an outer periphery region, wherein said reader is a card reader and said noncontact information storage medium is an IC card; and a display device for displaying a communication result of whether a reception of data transmitted from the medium via the antenna is successful, wherein said communication result includes a recognition of a proper positioning between the medium and the antenna coil, said display device including an LCD device disposed along said inner periphery region of said antenna coil and a plurality of LEDs disposed along said outer periphery.

2. A system for a noncontact information storage medium, having a semiconductor memory built in the medium and a reader for reading data from the medium via an antenna through magnetic induction or magnetic coupling, the system comprising:

an antenna coil having an inner periphery region and an outer periphery region, wherein said reader is a card reader and said noncontact information storage medium is an IC card; and display means for displaying a communication result of whether a reception of data transmitted from the medium via the antenna is successful, wherein said communication result includes a recognition of a proper positioning between the medium and the antenna coil, said display means including an LCD device disposed along said inner periphery region of said antenna coil and a plurality of LEDs disposed along said outer periphery.

3. The system for a noncontact information storage medium according to claim 2, further comprising an antenna block having the antenna coil for receiving radio waves transmitted from the medium, wherein said display means is mounted within said antenna block.

4. The system for a noncontact information storage medium according to claim 3, wherein said LEDs provides a change from an illumination state to a non-illumination state or vice versa, or a change from an illumination state in one color to a non-illumination state in another color.

5. The system for a noncontact information storage medium according to claim 3, wherein said display means is integrally mounted with said antenna block.

6. The system for a noncontact information storage medium according to claim 3, wherein the reader is a reader/writer and said antenna block further includes at least a portion of the reader/writer.

7. The system for a noncontact information storage medium according to claim 2, wherein said LCD device displays the communication result with the medium by using one of a word, a symbol, a pattern, and a text.

8. A system for a noncontact information storage medium, having a semiconductor memory built in the medium and a reader for reading data from the medium via an antenna through magnetic induction or magnetic coupling, the system comprising:

an antenna coil having an inner periphery region and an outer periphery region; and a display device for displaying a communication result of whether a reception of data transmitted from the medium via the antenna is successful, wherein said communication result includes a recognition of a proper positioning between the medium and the antenna coil, said display device including an LCD device disposed along said inner periphery region of said antenna coil and a plurality of LEDs disposed along said outer periphery region of said antenna coil.

* * * * *